United States Patent [19]

Herbert

[11] 4,358,262
[45] Nov. 9, 1982

[54] FILTER OR TOOL-CHANGING DEVICE FOR SCREW EXTRUDERS

[75] Inventor: Adolf Herbert, Hanover, Fed. Rep. of Germany

[73] Assignee: Hermann Berstorff Maschinenbau GmbH, Hanover, Fed. Rep. of Germany

[21] Appl. No.: 319,890

[22] Filed: Nov. 10, 1981

[30] Foreign Application Priority Data

Nov. 15, 1980 [DE] Fed. Rep. of Germany ....... 3043217

[51] Int. Cl.³ .............................................. B29F 3/00
[52] U.S. Cl. .................................... 425/185; 210/236; 210/447; 210/791; 210/DIG. 15; 366/87; 425/186; 425/192 R; 425/197; 425/451.9
[58] Field of Search ................... 425/192 R, 185, 182, 425/186, 451.9, 190, 595, 197-199, 376 R, 405 R; 100/269 A; 210/236, 447, 791, DIG. 15; 264/314; 366/87

[56] References Cited

U.S. PATENT DOCUMENTS

| | | | |
|---|---|---|---|
| 3,237,252 | 3/1966 | Ratcliffe | 100/269 A |
| 3,479,692 | 11/1969 | Biggelaar | 425/190 |
| 3,530,916 | 9/1970 | Williams | 425/192 R |
| 3,583,453 | 6/1971 | Upmeier | 425/186 |
| 3,653,419 | 4/1972 | Schutter | 425/199 |
| 3,675,934 | 7/1972 | Heston | 210/447 |
| 3,684,419 | 8/1972 | Voight | 425/192 R |
| 3,940,335 | 2/1976 | Kalman | 425/197 |
| 4,277,338 | 7/1981 | Hoagland | 425/199 |

FOREIGN PATENT DOCUMENTS

| | | |
|---|---|---|
| 2903773 | 10/1979 | Fed. Rep. of Germany . |
| 135595 | 5/1979 | German Democratic Rep. .............................. 425/199 |
| 360491 | 4/1962 | Switzerland ................... 425/192 R |

*Primary Examiner*—Jeffery R. Thurlow
*Attorney, Agent, or Firm*—Schwartz, Jeffery, Schwaab, Mack, Blumenthal & Koch

[57] ABSTRACT

In a screw extrusion device used for extruding plastics materials, a filter or tool-carrier is disposed at the downstream or outlet end of the extruder, an annular pressure element bearing on the carrier so as to secure and seal the carrier in its operative position. The carrier is displaceable perpendicularly to the flowpath of the plastics material so as to permit facile changing of the filter element. The annular pressure element is acted upon by hydraulic fluid, the hydraulic circuit including an annular pressure chamber. The inner and outer walls of the chamber are formed, respectively, by concentric metal bellows. One end of each bellows is mounted on the pressure element and the other end thereof on a housing.

2 Claims, 1 Drawing Figure

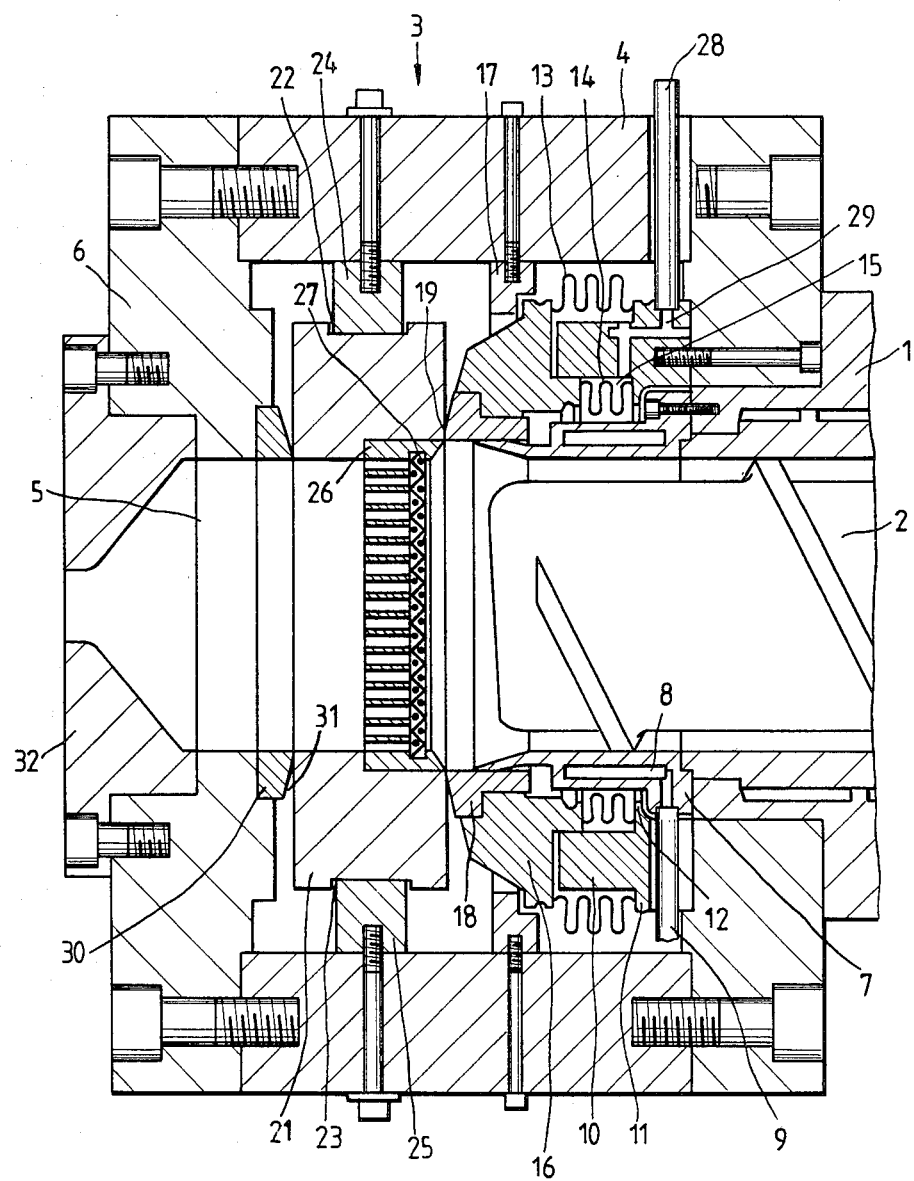

FILTER OR TOOL-CHANGING DEVICE FOR SCREW EXTRUDERS

BACKGROUND OF THE INVENTION

The present invention relates to a filter or tool-changing device for extrusion devices and more particularly, for screw extrusion devices used for extruding plastics material. Known filter-changing devices comprise a filter carrier which is displaceable perpendicularly to the direction of flow of the moulding composition to be filtered. The filter carrier has filter inserts received therein. The filter carrier may be in the form of a flat slider member which accommodates a plurality of filter inserts adjacent to one another or may be a plurality of separate filter-carrier members, each of which accommodates only a single filter insert. The filter-carrier must be secured in position when the filter inserts are being used and it must also be reliably sealed so that none of the plastics material can leak therepast.

It is known from United States Patent Specification No. 3,684,419 to provide an annular pressure element for securing and sealing the filter-carrier in a filter housing of a filter-changing device. This pressure element is displaceable in an annular cylindrical chamber and is hydraulically actuated. A sealing ring or washer is mounted in front (downstream) of the pressure element and provides the necessary sealing by acting upon the pressure element which is pushed against the periphery of the filter insert. After the hydraulic pressure has been reduced, the filter-carrier may be quickly detached and displaced. After the filter-changing process has been concluded, the hydraulic pressure is again increased to its original level so as to secure and seal the filter-carrier in the operating position, thereby securing and sealing the new filter insert in its correct position.

One disadvantage of such an arrangement is that an annular piston, which is displaceable in the cylindrical chamber, must have a number of piston seals provided on its external and internal surfaces. These seals require regular maintenance and may leak, thereby disrupting the extrusion process.

In addition, if a molten mass of plastics material is being processed, it is not possible to use conventional elastomeric sealing rings. This is because the plastics material may be at a temperature which is sufficiently high to cause damage to the rings.

A further filter-changing device is known from German Offenlegungsschrift No. 2 903 773 in which the annular pressure chamber has a front end portion in the form of a membrane or diaphragm. The membrane is deformable in an axial direction and abuts the filter-carrier, under the effect of the pressure in the pressure chamber, around the periphery of the filter insert. The filter-carrier should therefore be secured and sealed from the filter housing.

The membrane used in such annular pressure chamber is relatively thin so as to permit a possible lifting movement if pressure is applied to the filter-carrier. It will be apparent that a relatively thin membrane is subjected to some friction during the change-over of the filter-carrier and is therefore subject to wear. Consequently, the service life of the membrane is short. In addition, the membrane cannot compensate for thermal expansion of the filter housing nor for manufacturing tolerances in the dimensions of filter device, because the lifting capacity of the membrane acting in opposition to an annular piston is very small.

The present invention seeks to provide a filter-changing device in which the hydraulic pressure medium present in the annular pressure chamber is adequately sealed and in which the annular pressure element has an adequate lifting capacity.

According to the present invention, there is provided a filter or tool-changing device for screw extruders utilised for extruding plastics material, comprising a filter or tool-carrier which is displaceable perpendicular to the direction of flow of the plastics material, the carrier being secured and sealed in its operating position within a housing by an annular pressure element which is hydraulically actuatable by means of hydraulic fluid present in an annular pressure chamber, wherein the annular pressure chamber is defined by two metal bellows which are disposed concentrically one with the other, one end of each bellows being mounted on the annular pressure element and the other end of each bellows being mounted on the housing.

Because of their design, the metal bellows have a large extension capacity. The lifting movement of the pressure element, because it is connected to the two bellows, is substantially longer than in most, if not all, known devices. Sealing problems with regard to the hydraulic pressure medium do not arise, because the folding bellows are fixedly connected to the annular pressure element and to the housing by, for example, welding. Furthermore, the specific stroke length utilising metal folding bellows requires less force to be applied than would be the case if a metal membrane were used on the front end of the pressure chamber.

In an advantageous embodiment of the invention, an annular displacement member protrudes into the annular pressure chamber. In this way, the volume of the annular pressure chamber is reduced so that a smaller quantity of hydraulic fluid is needed. The thermal expansion of the hydraulic pressure medium is therefore reduced, so that the compensation tank, necessary in hydraulic systems, can be reduced in size.

The invention therefore provides a filter or tool-changing device utilising an annular, hydraulically actuated, piston of simple construction and in which satisfactory sealing of the hydraulic system and simultaneously, an adequate, axial stroke length are produced.

BRIEF DESCRIPTION OF THE DRAWING

One embodiment of the present invention will be further described, by way of example, with reference to the accompanying drawing, the single Figure of which shows a filter-changing device mounted on the outlet end of a plastics material extrusion device.

DESCRIPTION OF THE PREFERRED EMBODIMENT

In the drawing, there is shown an extrusion device comprising a screw 2 rotatably mounted in a barrel 1. A filter housing, generally referenced 3, is flange-mounted on the outlet end of the extrusion device and includes a throughflow channel which forms an extension of the flow channel of the extrusion device. The filter housing 3 comprises an external frame member 4 formed from a plurality of portions which are screw-threadedly connected. At its outlet end, that is to say, the end remote from the barrel 1, an end plate 6 having a throughflow bore 5 formed therein, is provided on the housing 3.

This plate 6 acts as a mounting for an injection moulding tool 32.

A tubular transition piece 7 is mounted in the frame 4 so as to be coaxial with the screw barrel 1. This transition piece 7 comprises an annular tempering channel 8 which is supplied with a tempering medium through a radially extending conduit 9. An annular displacement member 10 is disposed around the transition piece 7 and is screw-fitted into the frame 4. On the radially outer and inner peripheries of the displacement member 10 are formed shoulder portions 11 and 12 respectively. Tubular metal folding bellows 13 and 14 respectively are welded onto shoulders 11 and 12 respectively. The two metal folding bellows 13 and 14 are concentric with one another and the front ends thereof are welded onto an annular pressure element 16. The bellows therefore define an annular pressure chamber 15.

The pressure element 16 slides on a guide for the transition piece 7. A stop member 17 is securely mounted in the housing frame 4 and projects into the path of travel of the element 16 so as to limit the axial movement of the pressure element 16.

The pressure element 16 includes, or has fixedly connected thereto, an annular insert member 18 whose plane surface 19 acts as an annular sealing surface and presses against the rear face of a filter-carrier 21. The carrier 21 is displaceable perpendicularly to the direction of flow of the plastics material. The filter-carrier 21 has laterally directed guide grooves 22 and 23 formed therein, in which two opposed guide rails 24 and 25 mounted on the housing 4 are located with sufficient clearance. Filter support plates 26 are inserted into the filter-carrier 21, each plate carrying a filter element 27. A support plate 26 and its associated filter element 27 forms an interchangeable filter insert. A wearing ring 30 is screwfitted into the frame 4 so that its plane, annular rear surface 31 abuts sealingly against the front (in the direction of flow of the plastics material face) of the filter-carrier 21.

The mode of operation of such a device will now be described.

During the operation of the screw extrusion device 1, 2, the annular pressure chamber 15 defined by the two metal folding bellows 13 and 14, is acted upon by hydraulic pressure. The hydraulic fluid flows from a source (not shown) through a conduit 28 and a bore 29 formed in the displacement member 10. This pressure causes the bearing insert 18 of the pressure element 16 to press against the filter-carrier 21. The carrier 21 is in turn pressed against the wearing ring 30 in the housing frame 4. The filter-carrier 21 is therefore secured in place and the filter insert 26, 27 is sealed around its periphery by the annular sealing surfaces 19 and 31.

If a new filter insert 26, 27 is to be inserted into the flow path of the plastics material, the hydraulic pressure is first reduced. The filter-carrier 21 is detached quickly by displacing it a pre-determined distance perpendicularly to the direction of flow of the plastics material. This is effected by means of a displacement device (not shown) but which is preferably hydraulically operated. A new filter insert 26, 27 is located in the carrier 21 which is then returned to the flow path of the plastics material. Adequate sealing is still ensured during the change-over process by the still-effective, albeit reduced, hydraulic pressure. The pressure can then be increased to its original value and the device will operate as described hereinbefore.

I claim:

1. In a screw extrusion device utilised for extruding plastics materials having an inlet end and an outlet end, a housing securely mounted on said outlet end, said housing defining an axial flow path for said plastics material, guide means securely mounted in said housing and extending perpendicularly to said flow path, filter or tool-carrier means displaceably guided on said guide means, an annular pressure element bearing on said filter or tool carrier so as to secure and seal said filter or tool carrier in an operative position, hydraulic pressurizing means acting on said annular pressure element, said hydraulic pressurizing means including an annular pressure chamber, the improvement wherein said annular pressure chamber has inner and outer wall members, said wall members each having first and second ends, said first end of each said wall member being mounted on said annular pressure element and said second end of each said wall member being mounted on said housing, said inner and outer wall member each being a metal bellows, said bellows being disposed concentrically with one another.

2. A device as recited in claim 1, wherein said annular pressure chamber receives an annular displacement member said member projecting into said annular pressure chamber.

* * * * *